(12) United States Patent
Wadkins

(10) Patent No.: US 10,213,933 B2
(45) Date of Patent: *Feb. 26, 2019

(54) SYNTHETIC TURF SEAM INTEGRATION TEMPLATE SYSTEM AND METHODS OF USE

(71) Applicant: Joe Dennis Wadkins, Las Vegas, NV (US)

(72) Inventor: Joe Dennis Wadkins, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/830,542

(22) Filed: Dec. 4, 2017

(65) Prior Publication Data

US 2018/0085959 A1    Mar. 29, 2018

Related U.S. Application Data

(63) Continuation-in-part of application No. 14/839,816, filed on Aug. 28, 2015, now Pat. No. 9,833,920.

(51) Int. Cl.
*B26B 29/06* (2006.01)
*B29C 65/48* (2006.01)
*B29C 65/74* (2006.01)

(52) U.S. Cl.
CPC .............. *B26B 29/06* (2013.01); *B29C 65/48* (2013.01); *B29C 65/74* (2013.01)

(58) Field of Classification Search
CPC ... G01B 5/20; G01B 3/04; G01B 3/14; G01B 5/14; G01B 3/00; G01B 1/00; G01B 3/002; G01B 3/02; G01B 3/34; G01B 3/563

USPC ........................................................ 33/562
See application file for complete search history.

(56) References Cited

U.S. PATENT DOCUMENTS

| | | |
|---|---|---|
| 3,509,633 A | 5/1970 | Fernandes |
| 3,678,586 A | 7/1972 | Weber |
| 3,805,390 A | 4/1974 | Craig |
| 4,330,939 A | 5/1982 | Robinson |
| 4,502,232 A | 3/1985 | Broders |
| D358,780 S | 5/1995 | Lyons |
| 5,682,935 A | 11/1997 | Bustamante |
| 5,813,127 A | 11/1998 | Blevins |
| 5,842,402 A | 12/1998 | Collier |
| 5,922,157 A | 7/1999 | Snider |
| 5,960,554 A | 10/1999 | Kamykowski |
| 5,966,824 A | 10/1999 | Vazquez |
| 6,112,425 A | 11/2000 | Nelson et al. |
| 6,578,279 B1 | 6/2003 | Moon |
| 7,028,412 B2 | 4/2006 | Boomershine |
| 7,155,796 B2 | 1/2007 | Cook |
| 8,123,880 B2 | 2/2012 | Plunket et al. |

(Continued)

*Primary Examiner* — Yaritza Guadalupe
(74) *Attorney, Agent, or Firm* — Connie R. Masters

(57) ABSTRACT

A synthetic turf seam integration template system and method is provided that includes a template having a planar base with a perpendicularly joined positioner. The planar base is configured with a longitudinal cutting edge with a predetermined curvature and an opposing longitudinal non-cutting edge. The positioner, which aids in moving the template, is attached to the non-cutting edge. Variations of the predetermined curvature patterns are disclosed. An optional connector allows connection of two templates to create a longer template for usage on longer seams. Also disclosed are methods of using the seam integration tool in creating an undetectable seam in synthetic turf.

20 Claims, 10 Drawing Sheets

(56) References Cited

U.S. PATENT DOCUMENTS

| | | |
|---|---|---|
| 8,404,068 B2 | 3/2013 | Plunket et al. |
| 9,833,920 B1 * | 12/2017 | Wadkins ................. B29C 65/48 |
| 2005/0129906 A1 | 6/2005 | Knox |
| 2018/0085959 A1 * | 3/2018 | Wadkins ................. B26B 29/06 |

* cited by examiner

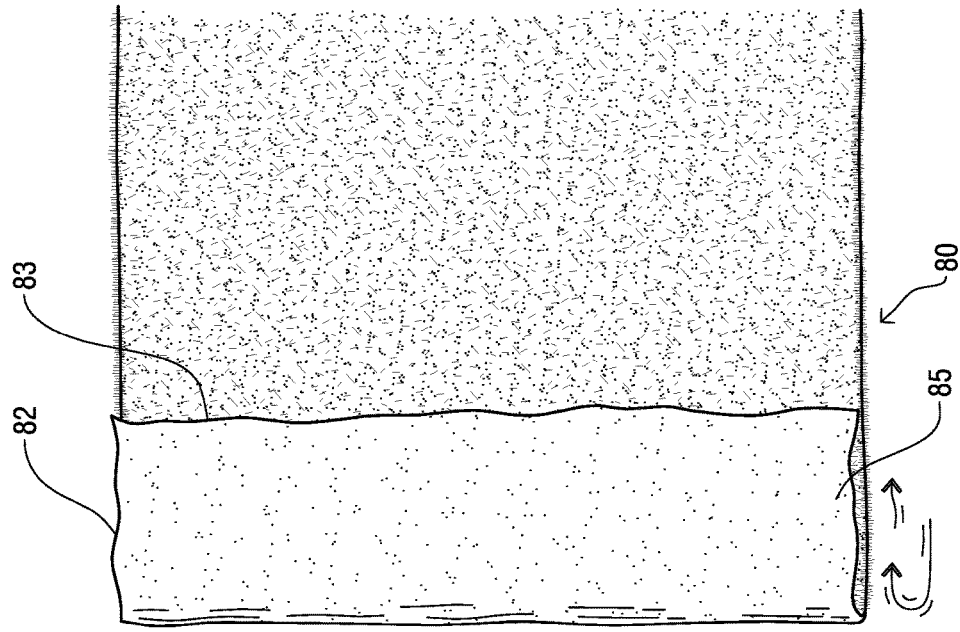
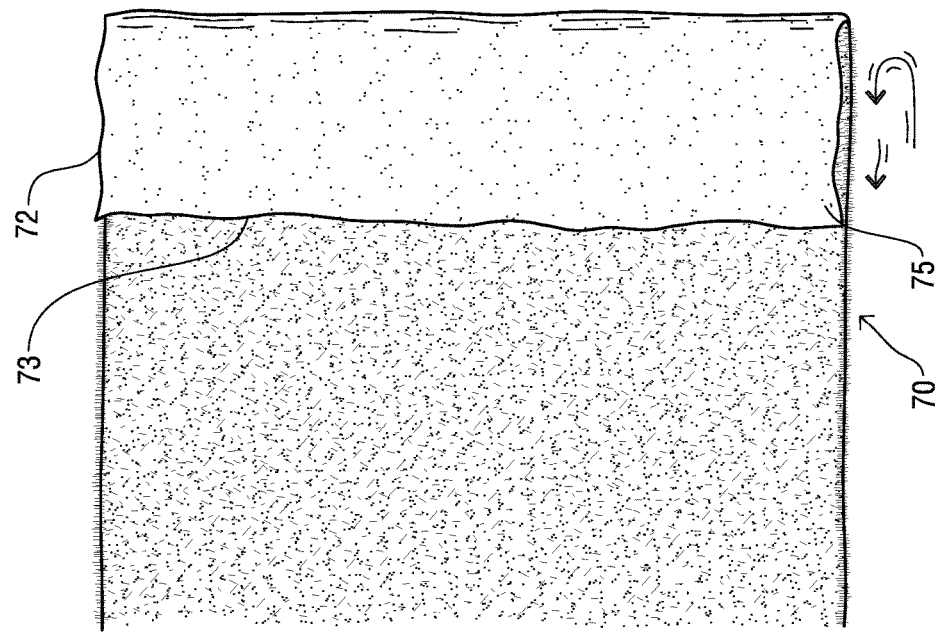
Fig. 8

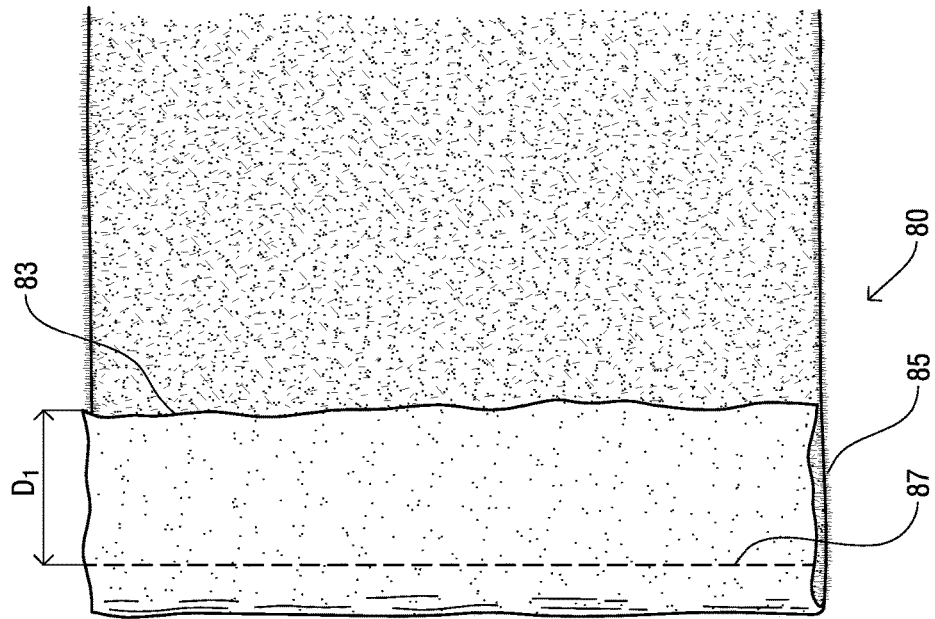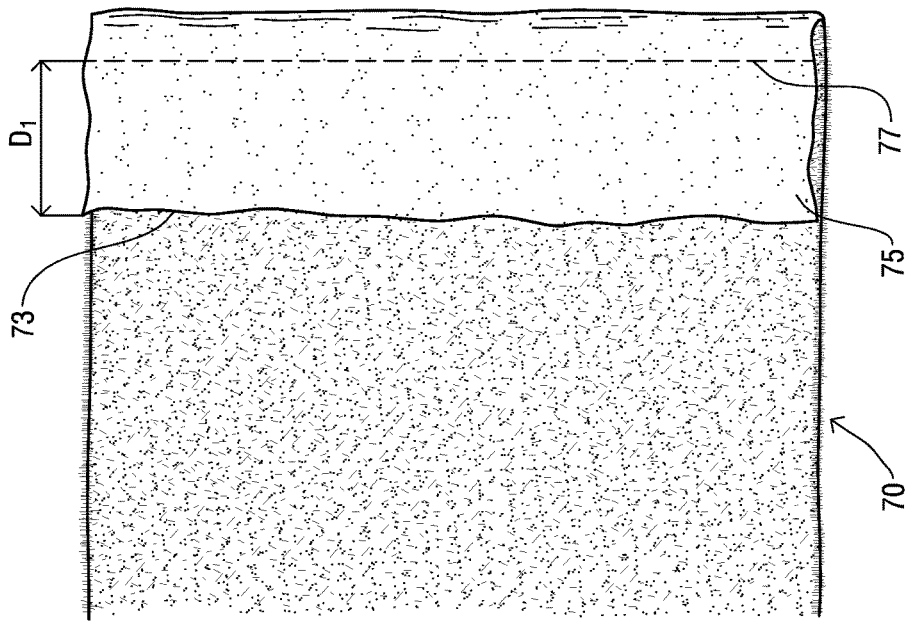
Fig. 9

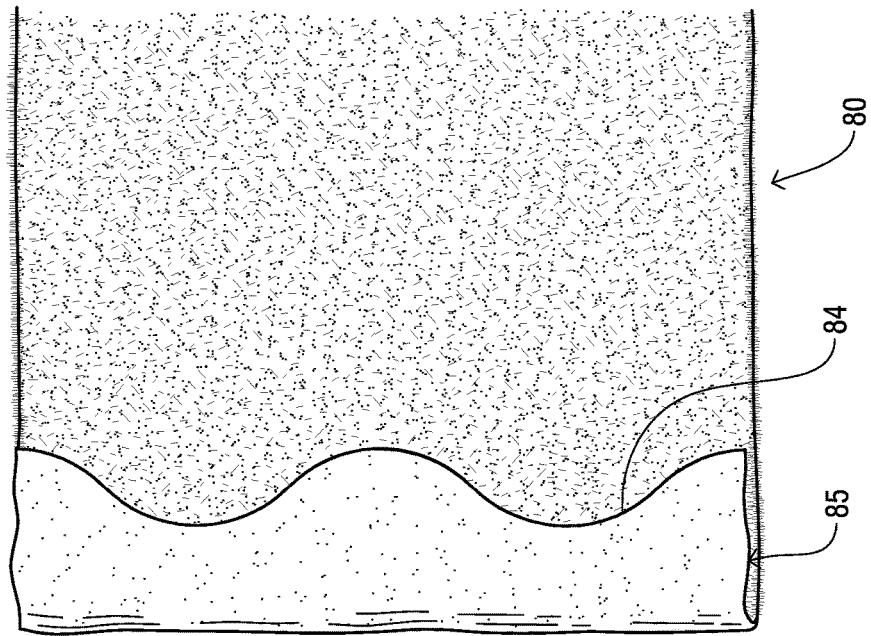
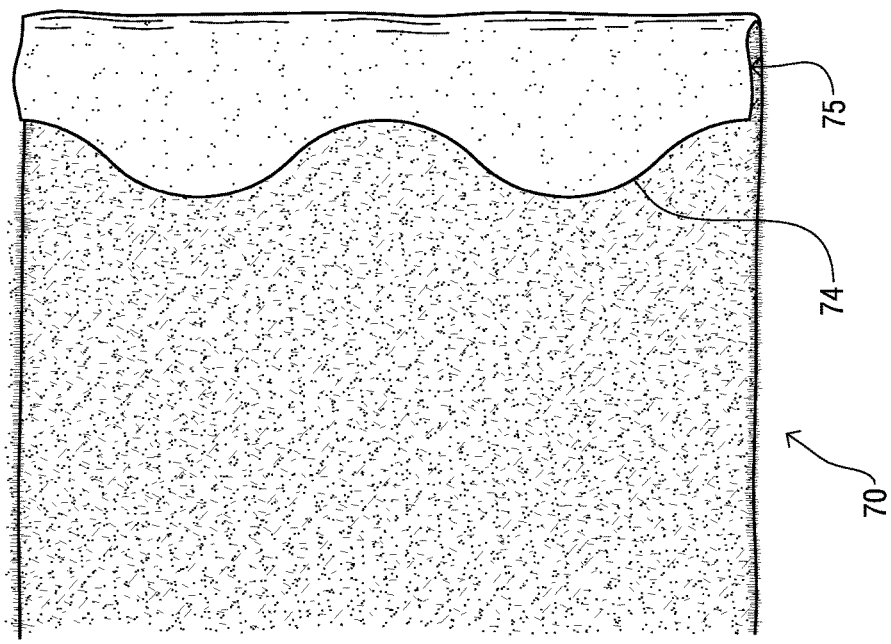
Fig. 11

SYNTHETIC TURF SEAM INTEGRATION TEMPLATE SYSTEM AND METHODS OF USE

CROSS-REFERENCE TO RELATED APPLICATIONS

The present nonprovisional application is a continuation-in-part application of currently pending U.S. patent application Ser. No. 14/839,816 filed on Aug. 28, 2015, now U.S. Pat. No. 9,833,920, which is incorporated by reference herein in its entirety.

FIELD OF INVENTION

This invention relates generally to hand tools for manual use and, more particularly, to a template and template system for cutting synthetic turf with methods of using the template system to create an inconspicuous turf seam.

BACKGROUND OF THE INVENTION

Replacing grass with artificial or synthetic turf provides several advantages, such as greatly reducing the need for lawn maintenance and eliminating the use of water for lawn irrigation. Synthetic turf is fabricated with an upward-facing synthetic grass face formed by tufts of grass (and, optionally, additional thatch tufts) and a downward-facing backing or understructure that supports the synthetic tufts of the grass face. It is usually provided by the manufacturer in roll form in sizes suitable for shipping and for retail store display. The turf roll is fabricated with a predetermined lateral width, such as a 10 or 12 feet width between the turf lateral sides, and with a longer longitudinal length, such as 100 to 300 feet in length. At the time of purchase, the required length of synthetic turf is dispensed off the roll of turf and cut to the proper length needed to meet the requirement of the particular turf installation area. If the area to be covered with turf has a width less than the predetermined width, a single width of turf is laid on the ground in the turf installation area. Then the sides are trimmed to fit the adjacent hard structures, which may be in the form of a sidewalk, lawn edging, roadway, planter border, etc.

Often, however, when installing synthetic turf there is a need to use multiple pieces of turf, because the predetermined turf lateral width provided by the manufacturer is too narrow to cover the width of the turf installation area. For example, if two turf pieces are necessary to meet the width requirement, they may be laid with the center or inner lateral straight edges of both turf pieces adjacent one another to begin to form a seam. To create the seam, the inner edges of each piece of turf are turned back a few inches, such as 15 to 30 inches. This results in the turf understructure being turned upward with the grass face of the turned back area laid back on the adjacent flat grass face area. The edges of the overlapped piece are trimmed to remove any scrim, generally following fiber lines on the backing or understructure of the turf and attempting to maintain the gauge of the fibers. (For instance, if the synthetic turf is manufactured with a ¾-inch gauge, an attempt is made to maintain the ¾ inch spacing at the edge of the overlaps.)

After trimming, the newly cut inner straight edges of synthetic turf are abutted by pulling and sliding the two turf pieces until the cut edges are together. The edges are turned back again to allow seam cloth or tape to be placed on the ground under the two cut edges. Adhesive is applied to the seam tape. The newly cut abutting inner edges of both turf pieces are flipped back flat with the turf understructure downward for adhering to the adhesive and with the inner edges of the two turf pieces touching each other. This creates a typical straight seam between the inner lateral edges of the synthetic turf. Then the outer lateral edges of both turf pieces are trimmed to fit the outlining hard structures.

However, this standard method of seam formation often creates a problem. At times this straight seam does not lay flat, but may, conversely, create a ridge or "Mohawk" effect, which cannot be pressed down or obliterated. This is particularly likely to happen with the newer synthetic turf that has a thicker, more realistic artificial grass face and incorporates an artificial thatch layer between the straight grass fibers, such as turf having a 50-ounce face weight or greater. A ridged seam will not improve over time, but will continue to have an upward thrust at the abutting edges, which will not be satisfactory to the homeowner or business owner who is having the synthetic turf installed.

Accordingly, there is a need for a device that will smoothly integrate the central or inner lateral edges of two sections of synthetic turf to form an imperceptible seam and prevent the formation of a ridged seam.

BRIEF SUMMARY OF THE INVENTION

The present invention is directed to a synthetic turf seam integration template system and methods of use. The seam tool system includes a template formed of a planar base with a longitudinal cutting edge, with an opposing straight longitudinal non-cutting edge, and with a flange-like positioner attached along the longitudinal non-cutting edge at a generally perpendicular angle. The positioner creates a short, upright handle used for manual positioning of the template; it forms an "L" shape with the template horizontal, planar base. In use, the planar base is positioned horizontally upon the turned back portion of the synthetic turf to be cut and the positioner extends upwardly.

The longitudinal cutting edge is not straight, but is shaped with a predetermined "irregular" pattern, such as a curved pattern or trapezoidal pattern, to promote the inconspicuousness of seams created with the cutting edge. Several variations or styles having multiple narrow portions interspersed with multiple wide portions are disclosed. The template base extends longitudinally from a first lateral base end to a second lateral base end.

In one aspect, which may be used with any of the embodiments of the invention, an optional connector is provided that can be used to connect a first one of the templates to a second, duplicate one of the templates (either the two primary templates or two coordinating templates). This template-connector-template system proves advantageous for larger installations of synthetic turf where the seams can be quite lengthy and using two templates joined together saves time.

The connector includes at least a connector horizontal member with a first and an opposing second longitudinal side and with a first lateral half and an opposing second lateral half. The first lateral half is configured with a connector-to-template fastening mechanism, such as, for example, at least two holes spaced a first preset distance apart for receiving bolts, a latch, a snap fit mechanism, or other conventional fastening mechanism. Similarly, the second lateral half is also configured with a similar connector-to-template fastening mechanism, such as, for example, at least two holes spaced a second preset distance apart for receiving bolts, a latch, a snap fit mechanism, or other conventional fastening mechanism. If the connector is to be used, the template planar base is configured with a base template-to-connector fastening mechanism that is complementary to the connector-to-template fastening mechanism, such as connector-attaching holes corresponding in spacing to the preset spacing of the connector holes, a complementary latch device, a complementary snap fit mechanism, or other conventional complementary fastening mechanisms.

Optionally, the connector may have a flange perpendicularly attached to or above one of the first or second longitudinal sides to aid in aligning the connector holes and the connector-attaching holes of the planar base.

In one embodiment of the invention, the template ends are of the same width, such as narrow or wide. In the method of use of the seam tool of this embodiment, one single template is used to cut the inner edge of the first piece of turf, and then turned 180 degrees and used to cut the inner edge of the second piece of turf. To cut the first side, the single template is placed with a lateral end on the outer edge of the first piece of turf, but to cut the second side, this single seam tool is offset to allow the cut curved portions to correspond. For example, if the predetermined curve shape is a wave shape, the edge of the single template with a narrow template portion may be placed at the outer edge of the first piece of turf, but when turned 180 degrees and used to cut the second piece of turf, the single template is offset to place the wide template portion at the outer edge of the second piece of turf. Thus, when folded back, the wider sections will align with the narrower sections of turf and vice versa. When two duplicate templates are joined by a connector, the template-connector-template system is used in the same manner; when it is turned 180 degrees to cut the second turf piece, it is offset.

In another embodiment of the invention, a second type of template is provided—a coordinating template, as shown in FIG. 7. This coordinating template is used with a primary template, but has a curvature that complements or synchronizes with the curvature of the primary template. The primary template and coordinating template form a coordinating template set. The primary template of the coordinating template set has a template first end with a first width (narrow or wide); the second coordinating template has a template first end having a width that is the complement to the width of the first template end (wide or narrow). For example, if the first end of the primary template forms the middle of a narrow portion of a curvature pattern, the first end of the second coordinating template will provide the middle of a wide portion of the same curvature pattern. In this embodiment, though two templates are required, no offset is needed during cutting of the second side of the turf. This embodiment reduces the possibility of user error because there is no need to remember to offset the template to begin cutting the second piece of turf.

An object of the present invention is to provide a system that can be efficiently used to smoothly integrate the inner lateral edges of two sections of synthetic turf to form an imperceptible seam.

This and other objects, features, and advantages of the present invention will become more readily apparent from the attached drawings and from the detailed description of the preferred embodiments which follow.

BRIEF DESCRIPTION OF THE SEVERAL VIEWS OF THE DRAWINGS

The preferred embodiments of the invention will hereinafter be described in conjunction with the appended drawings, provided to illustrate and not to limit the invention, where like designations denote like elements.

FIG. 8 is a diagram showing two pieces of synthetic turf (shortened longitudinally for illustration purposes) with the inner edges of both pieces of turf flipped backward to form a right and left overlap and with the turf understructure of both overlaps facing upward, as described in the method of use of the present invention.

FIG. 9 shows the creation or distinguishing of a lateral line on each of the two overlapped turf pieces, which is one of the steps in the method of use of the present invention.

FIG. 11 shows the newly cut lateral edges of both the right and left turf pieces.

Like reference numerals refer to like parts throughout the several views of the drawings.

DETAILED DESCRIPTION OF THE INVENTION

Shown throughout the figures, the present invention is directed toward a synthetic turf seam integration template, template system, and methods of utilizing a single template, two duplicate templates, a coordinating template set, and/or other parts of the template system. A first embodiment (shown in FIGS. 1-2, 5, 6, 10) discloses a single template 10 with a primary curvature pattern. This single template 10 can be used alone, can be used in combination with an optional connector 40 (FIGS. 3-4) with a duplicate template 10 having the primary curvature pattern, or can be used with a coordinating template 110 of the second embodiment that has a complementary curvature pattern. The second embodiment (shown in FIGS. 7 and 12) includes both the primary template 10 with the primary curvature pattern and a coordinating template 110, which has a curvature pattern that is the complement of the primary curvature pattern. Variations in the curvature pattern are also disclosed. Methods of using the template and template system of the invention include utilizing (with or without the optional connector 40) the single template 10 or the single template 10 with a coordinating template 110 to cut the center or inner edges of two pieces of synthetic turf to create an undetectable or inconspicuous seam between the two turf pieces.

Figure 1:
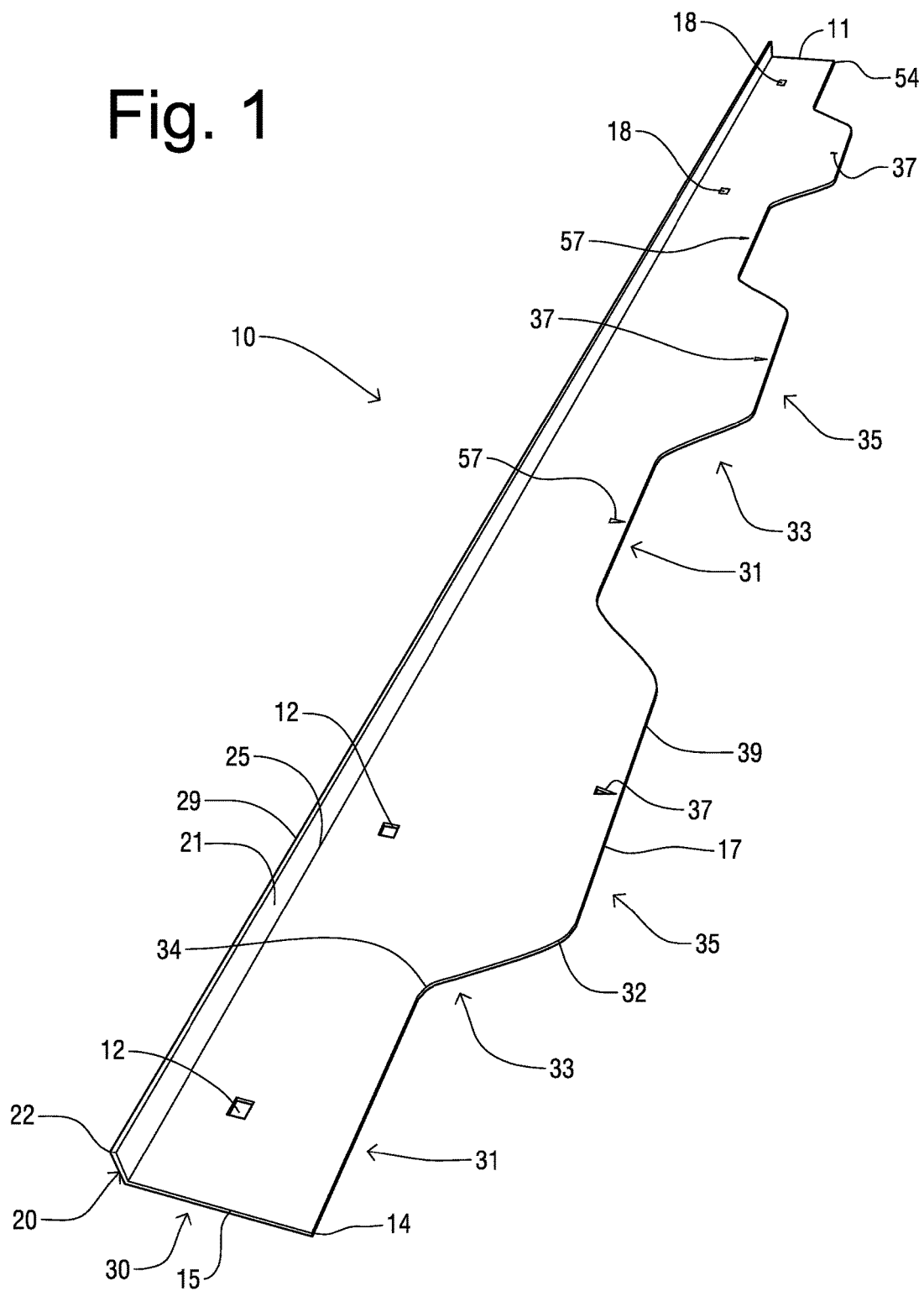
FIG. 1 is a perspective view of a single template of a first embodiment of the present invention illustrating a first variation in the curvature pattern of the cutting edge.

Referring now to FIG. 1, a single or primary template 10 of the synthetic turf seam integration template system is illustrated in accordance with a preferred embodiment of the present invention. As shown, the template 10 comprises a planar base 30 with a perpendicularly attached or integrally formed positioner 20.

Figure 2:
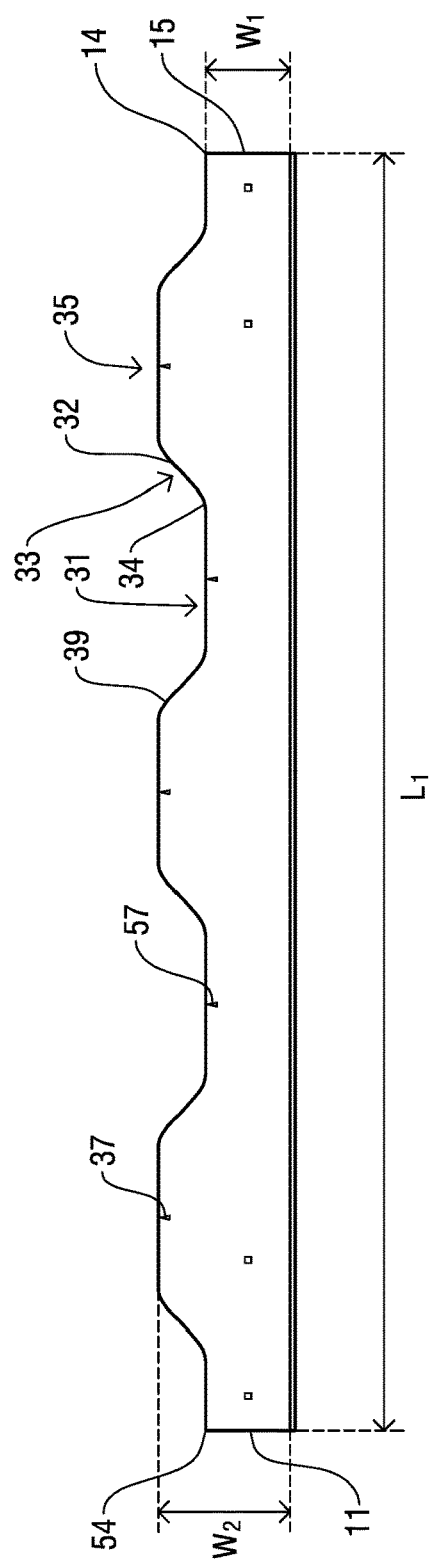
FIG. 2 is a top view of the single or primary template of FIG. 1 with dimension lines.

The planar base 30 extends longitudinally from a first lateral base end 15 (the left end on FIG. 1) to an opposing second lateral base end 11. The planar base 30 has a longitudinal cutting edge 39 with a predetermined primary curvature pattern and an opposing longitudinal non-cutting edge 25. The cutting edge 39 extends between longitudinal right-angle corners 14, 54 (FIG. 2). The planar base 30 is formed of a flat sheet or plate of relatively thin material having sufficient robustness to be used as a cutting pattern or template and having sufficient durability to be used in an outdoor environment.

Projecting perpendicularly (upwardly in FIG. 1 and when the tool is in use) from the non-cutting edge 25 of horizontally extending base 30 is a vertically extending straight flange, which serves as a positioner 20. The positioner 20 extends at least half the length of the longitudinal non-cutting edge 25 and preferably extends from over three-fourths of the length of the non-cutting edge 25 up to the length of non-cutting edge 25. The positioner 20 may be attached to or formed unitarily with base 30. The positioner 20 is used as a handle, handgrip, or holder that provides a convenient gripping projection that enables the user to easily situate the template 10 in the correct location or nudge the template 10 slightly for alignment purposes both at the first location of cutting when beginning the cutting process and when moving the template 10 to any second and following locations along the inner turf edge as it is cut. Positioner 20 includes upright portion 21 that ends in upright edge 29. The corners 22 formed at the outer ends of the upright edge 29 may be formed as generally a right angle, as shown in FIG. 1, or may be somewhat rounded for safety.

Figure 5:
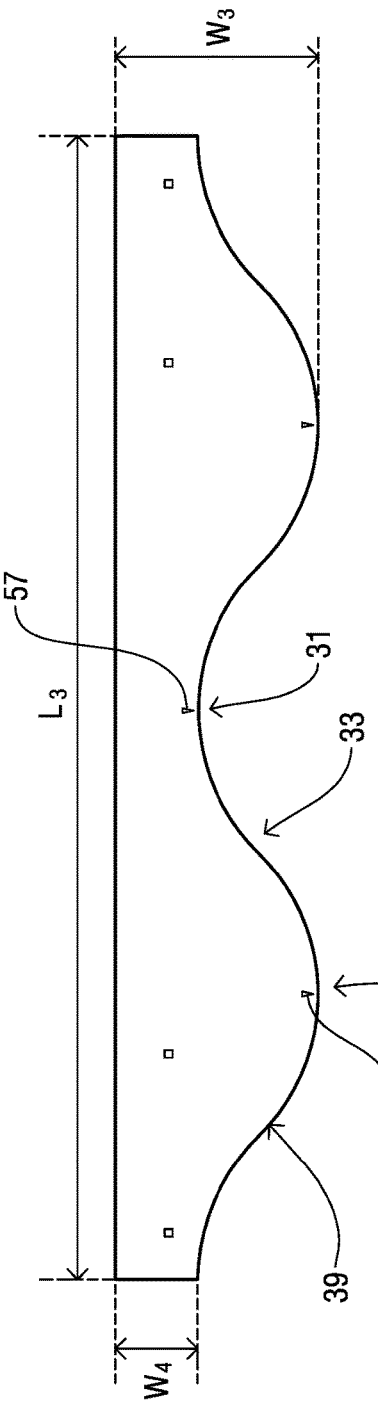
FIG. 5 is a top view of a primary template showing another variation of the predetermined curvature pattern of the cutting edge of a template of the present invention.
Figure 6:
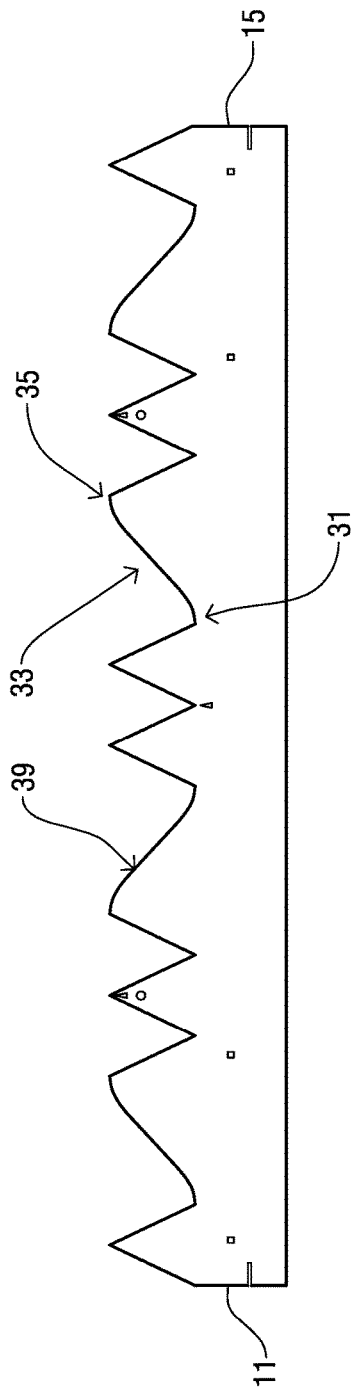
FIG. 6 is a top view of a single or primary template showing a further exemplary variation of the predetermined curvature pattern of the cutting edge.
Figure 7:
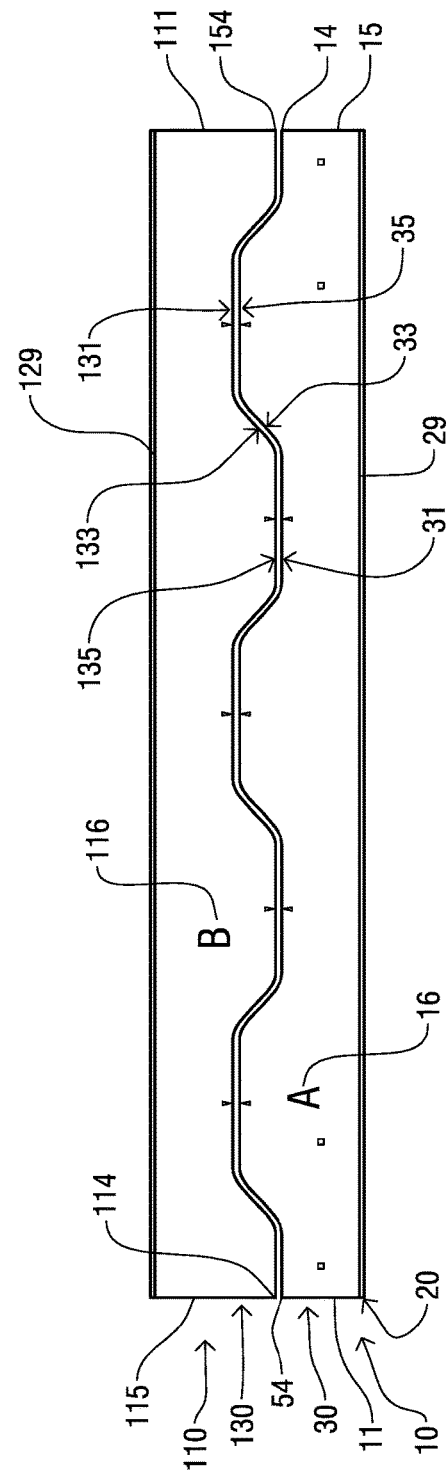
FIG. 7 is a perspective view of the primary template with a second coordinating template, which together form a coordinating template system of a second embodiment of the present invention.

The longitudinal cutting edge 39 is not straight, but instead is configured with any of a variety of predetermined primary curvature patterns. Several variations of the curvature pattern are illustrated, but other curvature patterns are within the scope of the invention. For example, FIGS. 1-2 and 7 illustrate an isosceles trapezoidal curvature, FIG. 5 illustrates a wave curvature pattern, and FIG. 6 illustrates an irregular curvature pattern. Other possible curvature patterns include a triangle pattern, a parallelogram pattern, a non-isosceles trapezoidal pattern, and the like. The trapezoidal curvature pattern provides the advantage of a reduction in waste compared to the wave curvature pattern; this is due to the decreased width W3 (FIG. 2) that is needed for the trapezoidal pattern compared to the wave pattern of FIG. 5. The trapezoidal curvature pattern also provides an increased efficiency of use compared to the irregular curvature pattern of FIG. 6. All of the predetermined curvature patterns are created when the planar base 30 includes multiple laterally narrow portions 31 interposed between or interspersed with multiple laterally wide portions 35 with the exterior edges of the narrow and wide portions 31, 35 forming the curvature pattern.

As an example, if a short single template 10 is desired, it may be formed with one of the narrow portions 31 at the first lateral base end 15, with another narrow portion 31 at the opposing second lateral base end 11, and with one wide portion 35 disposed between the first and second narrow portions 31 at either lateral base end 11, 15. However, preferably, the single template 10 additionally includes additional interspersed wide 35 and narrow 31 portions, as illustrated. A shorter template 10 provides the advantage of weight reduction and ease of positioning, but a longer template 10 provides efficiency and increased speed of cutting, because less moving and repositioning is required.

Between each narrow portion 31 and the adjacent wide portion 35 is an interlinking portion 33. Together, the exterior edges of the narrow portion 31, wide portion 35, and interlinking portion 33 form the cutting edge 39. The exterior edges of the narrow portion 31, wide portion 35 and interlinking portion 33 may be generally straight with corners 32, 34 connecting the portions, as in FIGS. 1-2, or may be generally curved with less defined points of juncture, as in FIG. 5, or may vary between one set of wide 35 and narrow 31 portions and the adjacent set of wide 35 and narrow 31 portions, as in FIG. 6.

Preferably, the template 10 includes wide offset arrows 37 centered in the middle of the wide portions 35 and narrow offset arrows 57 centered in the middle of the narrow portions 31. The offset arrows 37, 57 are disposed in the middle of the widest and narrowest portions of the predetermined curvature sections to allow easy visual alignment by the template system user. The offset arrows 37, 57 may be printed, inscribed or embossed upon the template 10, may be stickers adhesively applied to the template 10, may be cut into the template 10, or otherwise applied to the template in the appropriate location to allow the user to align an arrow to an outer edge of the turf when the inner edge of the turf is to be cut.

Preferably, the planar base 30 and positioner 20 are formed of metal for most applications, but may optionally be formed of plastic. Any of various metal materials may be used, such as galvanized steel, stainless steel, aluminum or the like. Preferably the metal material chosen is corrosion resistant and lightweight, yet robust and durable. The usage of aluminum material provides advantageous characteristics, such as having a lighter weight than steel and having a high strength-to-weight ratio while being durable and rust-proof. The usage of plastic to form template 10 also provides advantages, such as being lightweight, rustproof, and economical. Additionally, a template 10 formed of plastic can be rolled and placed into a bucket or cylinder, which facilitates storage and transport before the sale of the tool and between uses.

To form the template 10, a plate or sheet of metal can be cut in a shape that includes both the base 30 (with a predetermined curvature) and the positioner 20. Laser cutting or the like may be used to make this outline cut. Then the cut metal shape can be bent so that the positioner 20 forms a substantially 90-degree angle with the non-cutting edge 25 of the base 30. The bend may be made by means known in the metal fabricating art, such as using cold forming, hot forming or annealing means. If the template 10 is to be formed of plastic, it may be formed by any plastic molding technique as is known or becomes known in the art, such as injection molding, compression molding, blow molding, thermoforming, or the like, and, therefore, bending may not be necessary.

If first and second duplicate templates 10 are to be used with the optional connector 40, the planar base 30 of the first and second duplicate templates is further configured with left side connector-attaching holes 12 and right side connector-attaching holes 18 to allow the connector 40 to be manually attached to the right side of the first duplicate template and to the left side of the second duplicate template, thereby, in effect, creating a template of double the length of a single template. In larger areas of turf installation, the usage of the connector 40 may prove more efficient and save time, as less movement and relocation of the template 10 is required.

Figure 3:
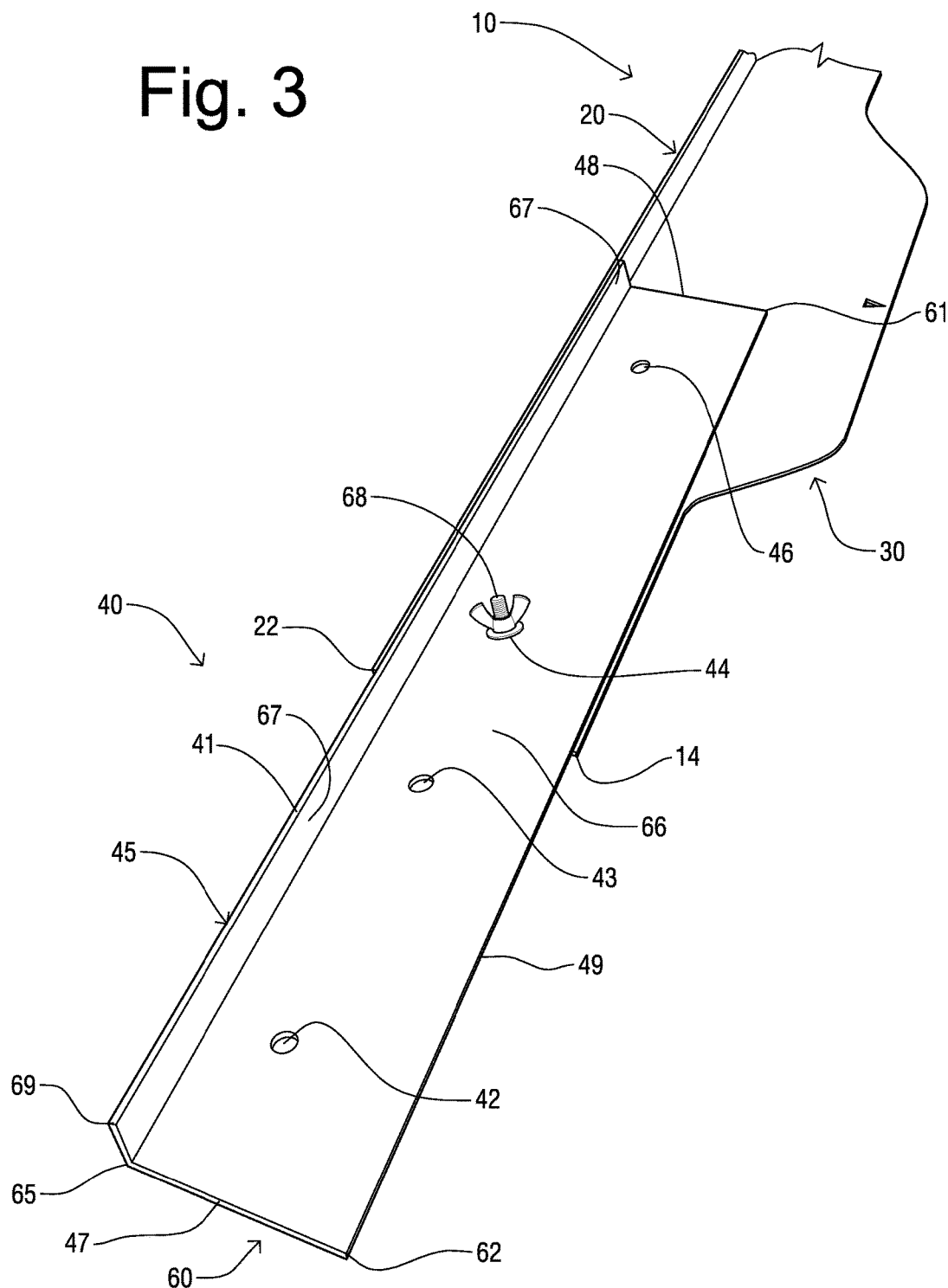
FIG. 3 is a perspective view of an optional connector of one aspect of the template system of the present invention, which is used to connect two duplicate first templates together to provide the functionality of a longer template for more efficiency when longer seams are needed.
Figure 4:
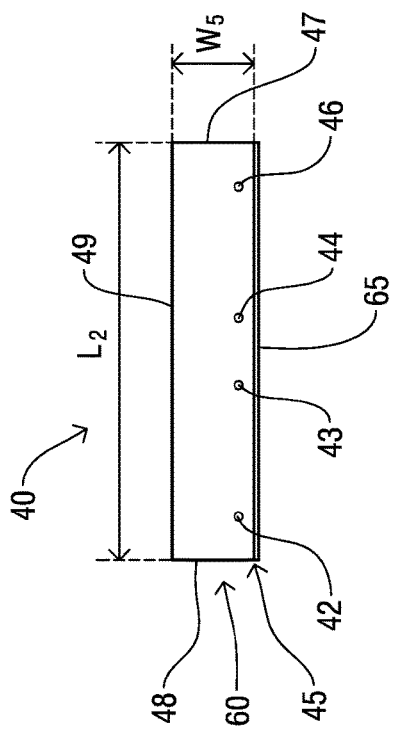
FIG. 4 is a top view of the optional connector of FIG. 3.

The optional connector 40 is illustrated in FIGS. 3-4. The connector 40 may be used with two identical or duplicate templates 10 in non-coordinating mode. When using the coordinating template set, two connectors 40 will be required. The first connector 40 will connect the two duplicate templates 10 to create a longer template set for cutting the first turf piece. The second connector 40 will be required to connect two of the coordinating templates 110 to create a longer second template set to cut the opposing second turf piece.

The connector 40 includes at least a horizontal member 60 and, optionally, includes a connector flange 45 that is perpendicularly attached to, or integrally formed with, the horizontal member 60.

The horizontal member 60 extends longitudinally from a first lateral end 47 to an opposing second lateral end 48. The horizontal member 60 has an outer longitudinal edge 49 that extends from outer corner 61 to outer corner 62 and has an opposing inner longitudinal edge 65. Outer longitudinal edge 49 is illustrated as straight, but the shape is not important to the invention because it does not extend past cutting edge 39, so may optionally be curved or shaped in another manner. Inner longitudinal edge 65 is straight to allow it to be manually abutted against the inner corner formed by the template planar base 30 with the positioner 20 to assist in alignment of the connector holes 42, 43, 44, 46. The horizontal member 60 is formed of a flat sheet or plate of relatively thin material having sufficient robustness to be used to form a longitudinal connection between a first primary template 10 and a second primary template 10 (or between a first coordinating template 110 and a second coordinating template 110), thereby lengthening the cutting edge 39 by combining the cutting edge 39 of the first template 10 with the cutting edge 39 of the second template 10 (or by lengthening the cutting edge 139 by combining the cutting edges 139 of both a first coordinating template 110 and a second coordinating template 110).

The connector horizontal member 60 is configured with connector left lateral holes 42, 43 disposed on the left half of connector 40 and connector right lateral holes 44, 46 disposed on the right half of connector 40. The left lateral holes 42, 43 are spaced to align with the right side connector-attaching holes 18 of the planar base 30 of a first template. The right lateral holes 44, 46 are spaced to align with the left side connector-attaching holes 12 of the planar base 30 of a second template. Joining mechanisms 68, such as bolts, are inserted into the aligned holes to join the connector 40 to each of the two templates 10 to releasably create the template-connector-template combination. Similarly, the connector 40 may also be used with two coordinating templates 110.

The optional vertical flange 45, if provided, projects upwardly from the inner edge 65 of horizontal member 60 forming a corner with the inner longitudinal edge 65. This forms a generally L-shaped connector 40. The vertical flange 45 may extend partially or fully along the length of the connector inner longitudinal edge 65. The flange 45 is shown as extending the full length of the connector inner longitudinal edge 65. The flange 45 has an upright portion 67 ending in upper edge 41 with upright corners 67, 69, which may be right angle corners or rounded. The upright portion 67 of flange 45 is preferably a similar height or the same height as the upright portion 21 of positioner 20. The flange 45 serves to assist in moving or nudging the connector 40 into the position where it can be removably joined to planar base 30 of template 10 by aligning the left lateral holes 42, 43 with the right side connector-attaching holes 18 of a first template and in aligning the right lateral holes 44, 46 with the left side connector-attaching holes 12 of a second template.

Preferably, the connector 40 and the optional flange 45 are formed of metal, although plastic material may also be used. Any of the metals and fabrication techniques mentioned above in the formation of the template 10 may be used in the fabrication of the connector 40 and the optional flange 45.

FIG. 7 illustrates the two types of templates, the first or primary template 10 of the first embodiment and a coordinating template 110 that may be used with the primary template 10. The primary template, as in the first embodiment, has a cutting edge 39 configured in accordance to the predetermined primary curvature pattern. The coordinating template 110 is similar to the primary template 10, except that the cutting edge 139 is configured with a coordinating or complementary curvature pattern. The complementary curvature pattern is offset so that (1.) the middle of the widest part 35 of the primary curvature pattern matches the middle of the narrowest part 131 of the complementary curvature pattern and (2.) the middle of the narrowest part 31 of the primary curvature pattern matches the middle of the widest part 135 of the complementary curvature pattern. Thus, when a primary template 10 is used to cut the inner edge 73 of a first turf piece and the complementary template 110 is used to cut the inner edge 83 of a second turf piece, the curvature patterns align; there is no need for the user to manually offset either template. For convenience of the user, the two types of templates may be labeled, such as the "A" 16 and "B" 116 labeling shown in FIG. 7.

The methods of use of the synthetic turf seam integration template system of the present invention are shown in FIGS. 8-12. The method of using the primary template 10 of the first embodiment to cut the inner edges 73, 83 of both a first and a second turf piece is shown in FIGS. 8-11. Alternate steps of using the primary template 10 of the first embodiment along with the coordinating template 110 of the second embodiment are discussed in relation to FIG. 12.

When starting the use of the synthetic turf seam integration template system of the present invention, as shown in the diagram of FIG. 8, the two pieces of turf (turf piece 70 and turf piece 80) to be joined by a seam are positioned with the inner edges 73, 83 near each other. (FIGS. 8-12 are shortened longitudinally for illustration purposes. In use, the longitudinal length of the two pieces of turf would generally be several to many times the length L1 of the template 10.) The inner edges 73, 83 of both the left turf piece 70 and the right turf piece 80 are turned back. The grass face of the turned back portion of left turf piece 70 is overlapped onto the grass face of the flat, non-turned back portion of the left turf piece 70. Therefore, this overlapped turf 75 has the turf backing or understructure facing upward and the grass face facing downward. On the right side, similarly, the overlapped turf 85 has the turf backing or understructure facing upward and the grass face facing downward.

FIG. 9 shows a chalk line or other visible marker line 77, 87 which is created by the user on the understructure of each turf overlap 75, 85. For example, the user may measure a distance D1 from the inner edge 73, 83 of each turf piece 70, 80, and then snap a chalk line at the distance D1. The distance D1 is slightly wider than the width (W1 of FIG. 2 or W3 of FIG. 5) of the template 10 to allow room for placing the template 10 on the line and cutting the edge of the turf that extends beyond the template 10. The distance D1 may be, for example, in the range of 5 to 10 inches, but is preferably 6-8 inches. However, the distance D1 should be only slightly larger (such as 1 to 6 inches larger) than the width of the template 10 to avoid excessive waste of the synthetic turf material. In some instances, the visible marker line 77, 87 may be a line that is inherent in the turf understructure. Some turf is configured with lines that may be visible simply due to the attachment of the turf tufts or to other inadvertent results of the fabrication techniques, so one of these inherent lines that is disposed at approximately the distance D1 may be merely located by the user. For instance, the turf may be fabricated with parallel lines printed or stamped onto the base or parallel lines may be inadvertently created via the attachment of grass tufts of the grass face of the turf. Any line 77, 87, created or an inherent feature of the turf, that can be visually distinguished can be used, but, commonly, a chalk line will need to be snapped onto the turf understructure.

Figure 10:
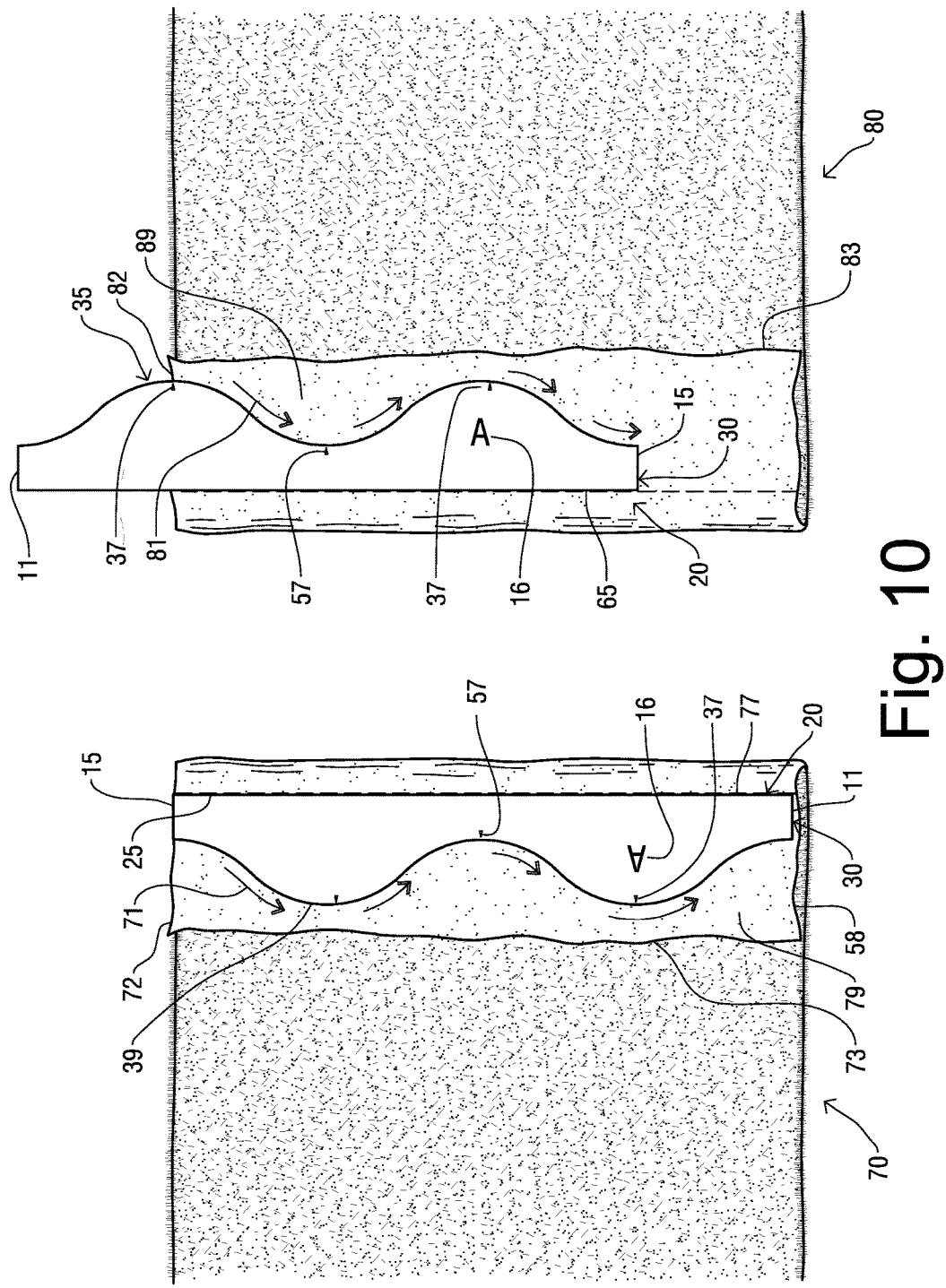
FIG. 10 shows additional steps in the method of use of the present invention.

As seen on the left half of FIG. 10, the tool user then positions the lateral end 15 of template 10 on the starting edge 72 of the turf 75 and aligns the non-cutting edge 25 along the visible line 77. A carpet knife, utility knife or similar turf-cutting tool is used to cut 71 near the inner edge 73 of the turf overlap 75 along the cutting edge 39 in the predetermined curvature pattern. The cut is made only through the turf understructure of the overlap 70. The predetermined curvature illustrated in FIG. 10 is the wave curvature, but the cutting of other curvature patterns proceeds through the same steps.

If the inner edge 73 of the turf piece 70 that is to be cut is longer than the template 10 (which is not the case in FIG. 10), the template 10 is manually picked up and repositioned using the positioner 20 with the non-cutting edge 25 positioned along chalk line 77 and with the lateral end 15 of the template positioned at the end of the previous cut. Another cut is then made along the cutting edge 39. The template 10 may be moved, repositioned, and utilized as a cutting edge multiple times until the ending edge of the turf piece is reached. After completion of all of the cuts required to reach the ending edge 58 of the turf piece, the turf wastage 79 that has been cut from the main portion of the first turf piece 70 is removed.

After the first turf piece 79 is cut, the user will begin the steps necessary to cut the second turf piece 80. These steps are shown on the right half of FIG. 10. The tool user removes the template 10 from the first turf piece 70, rotates it 180 degrees so the non-cutting edge 25 is toward the fold of the turf piece 80 and the cutting edge 39 is toward the turf center edge 83, and repositions it onto the second turf piece 80. The repositioned template 10 is shown in this second position on the right side of FIG. 10. To reposition the template 10, the offset arrow 37 in the middle of the widest portion of the curvature is positioned at the starting edge 82 of the turf 85. This is in contrast to the positioning of the lateral end 15 of template 10 (which is the middle of the narrowest portion of curvature of the template 10) on the starting edge 72 of the overlap 75 for the cut of the first turf piece 70. The placement of the offset arrow 37 at the starting edge 82 of the second turf piece 80 will cause this second side cut to form the counterpart to the cut just performed on the first turf piece 70. This positioning is done so that the middle of the narrowest part of the predetermined curve pattern of the first cut will meet the middle of the widest part of the predetermined curve pattern of the second cut. This allows the two cut pieces to abut smoothly when folded back with the grass face upward.

Again, as in the first cut, the non-cutting edge 25 of the template 10 is aligned along the visible line 87. The turf-cutting tool is used to cut 81 the inner edge 83 of the turf overlap 85 in the predetermined curvature using cutting edge 39. As with the first cut of turf piece 70, if the turf piece 80 is longer than the template 10, the template 10 will need to be raised and repositioned to accommodate the longer cut. The user may be required to move the template 10 one or multiple times, depending on the length of the inner edge 83 of the turf piece 80 to be cut. After the one or more cuts of overlap 85 are made, the second turf wastage piece 89 is removed.

FIG. 11 illustrates the two turf pieces 70, 80 after both turf pieces 70, 80 have been cut and both wastage pieces 79, 89 have been removed. The freshly cut edges 74, 84 are ready to be positioned together to form the seam.

Next the two overlaps 75, 85 are flipped back flat with the turf understructure downward and with the turf grass face upward. The cut edges 74, 84 are adjusted and pulled to abut at the center seam that will be created. The widest part of the first (left) cut inner edge 74 aligns with the narrowest part of the second (right) cut inner edge 84, and vice versa. Then, as per the standard technique, seam cloth or tape is placed under the seam with an adhesive on the upward side. Both cut inner edges are manually placed onto the adhesive of the seam tape and pressed downward.

Figure 12:
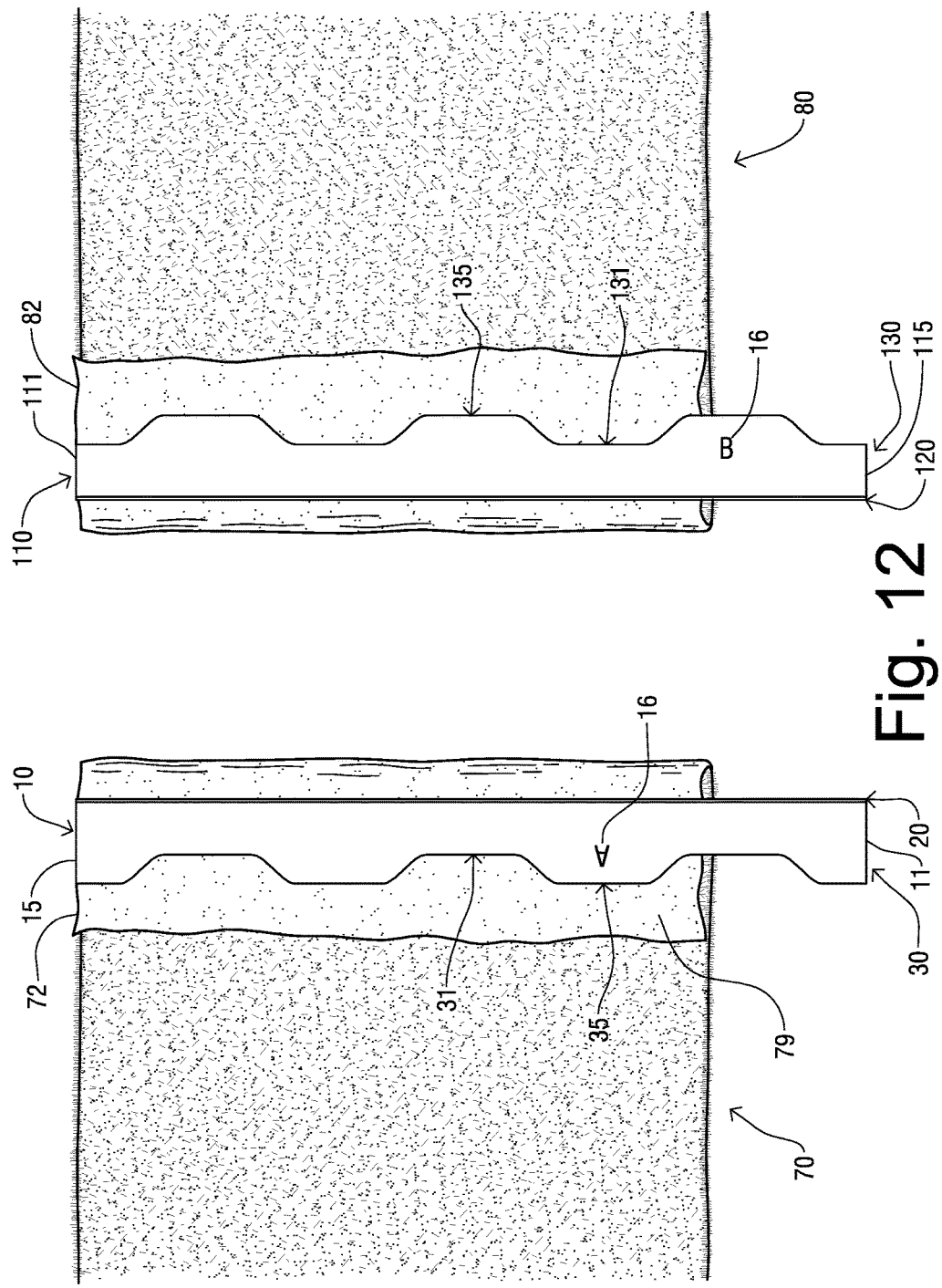
FIG. 12 shows a variation of the method steps illustrated in FIG. 10, utilizing the coordinating template system.

FIG. 12 illustrates the usage of the two types of templates, the primary template 10 of the first embodiment that is used with the coordinating template 110 of the second embodiment. Utilizing the coordinating template 110 removes the need for the user to remember to offset the first template 10 to cut the second turf piece 80. This is because the curvature pattern of the coordinating template 110 is offset the proper amount. Therefore, the user merely uses the primary template 10 to cut the first side (the first turf piece 70) and uses the coordinating template 110 on the second side (second turf piece 80). Both templates 10, 110 are aligned at the starting edges 72, 83, thus simplifying the usage of the template system of the present invention.

The first cut of turf piece 70 is illustrated on the left side of FIG. 12. The turning back of the inner edges 73, 83 of the first and second turf pieces 70, 80 (shown in FIG. 8) and the location or creation of a visible orientation line 77, 87 (shown in FIG. 9) has already occurred prior to the steps described in relation to FIG. 12.

As shown on the left side of FIG. 12, the lateral end 15 of the primary template 10 is placed at the starting edge 72 of the overlap 75 just as in the first embodiment. The same steps as described above in relation to the primary template 10 are then followed with the cut following the curvature pattern and resulting in a wastage piece 79 that is removed.

The cut of the second turf piece 80 is done using the second type of template, the coordinating template 110. When using this coordinating template 110, the lateral template end 111 is placed on the starting edge 82 of the second turf piece 80. Consequently, when using the coordinating template 110, both the primary template 10 and the coordinating template 110 have their outermost lateral edges 15, 111 placed on the starting edges 72, 82 of the turf pieces 70, 80. There is no need for the user to remember to use the offset arrows 37, 57 to offset any template. After placement of the lateral template end 111 onto the starting edge 82, the cutting steps and seaming steps proceed as described above.

When a longer template would be desirable due to the size of the turf installation, the user may choose to use the connector 40 to create a template-connector-template combination, which doubles the length of a single template by joining a first primary template 10 to a second primary template 10. The connector left lateral holes 42, 43 are aligned with the right side connector-attaching holes 18 of the planar base 30 of the primary template. A joining mechanism 68 is used to connect the right portion of the template planar base 30 to the left portion of the connector 40. Then the right lateral holes 44, 46 are aligned with the left side connector-attaching holes 12 of the planar base 30 and joined by the joining mechanism.

In a similar manner, two duplicate coordinating templates 110 may be joined by connector 40, if needed.

Though the template system has been described as utilized for cutting synthetic turf to create an undetectable seam, the template system may also be used for cutting other similar materials to create an undetectable seam, such as carpet pieces, fabric pieces (such as might be adhered to a structure or otherwise need an undetectable seam), or the like.

The sizes and materials used for the template system may be dictated by the material to be cut and user preferences as to weight, length, and durability. Exemplary measurements are given for the template system that is to be used to cut synthetic turf. The length L1 (FIG. 2) of the template 10 from the first lateral end 15 to the second lateral end 11 may be in the range of from 4 to 15 feet, but is preferably in the range of 6 to 10 feet and is most preferably 7 to 9 feet. The distance from a first offset arrow 37 at a first widest part of the template 10 to a second offset arrow 37 at a second widest part of the template 10 may be in the range of 6 to 40 inches, but is preferably in the range of 15 to 30 inches and is most preferably 23 to 27 inches. The distance between the offset arrows 31 that indicate the narrowest part of the template would necessarily be equal to the distance between the offset arrows 37 of the widest part. As depicted in the figures, with the template 10 ending at the middle of a narrow portion 31 of the curvature pattern, the distance from the outermost (leftmost or rightmost) offset arrow 37 to the outermost (leftmost or rightmost) edge of a lateral end 11, 15 will necessarily be half the distance between adjacent offset arrows 37. If the template 10 ends with the widest part 35 of the curvature pattern at a lateral end 11, 15, the distance from the outermost offset arrow 57 to the outermost edge of a lateral end 11, 15 will necessarily be half the distance between adjacent offset arrows 57.

As seen in FIG. 2, when the template 10, 110 has an isosceles trapezoidal curvature, the width W2 between the non-cutting edge 25 and the widest part of the template 10 may be in the range of 3.5 to 15 inches, but is preferably in the range of 6 to 10 inches and most preferably 6.5 to 7.5 inches. And the width W1 between the non-cutting edge 25 and the narrow portion of the planar base 30 may be in the range of 2 to 8 inches, but is preferably in the range of 3 to 5 inches and most preferably 4 to 4.5 inches.

When the template 10, 110 has other curvature patterns besides the isosceles trapezoidal curvature pattern, the measurements may differ. For example, the width W3 (FIG. 5) between the non-cutting edge 25 and the widest part of the planar base 30 may be larger when a curved or wavy pattern is used. The width W3 on the curved pattern may be in the range of 3.5 to 20 inches, but is preferably in the range of 7 to 12 inches and most preferably 9 to 10 inches. The width W4 (FIG. 5) between the non-cutting edge 25 and the narrow portion of the planar base 30 is similar to the width W1 of FIG. 2.

When the template 10, 110 is formed of aluminum, the thickness of the aluminum may be in the range of 0.08 to 0.3 inch, but is preferably between 0.12 and 0.14 inches.

The invention illustratively disclosed herein suitably may be practiced in the absence of any element which is not specifically disclosed herein.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A seam cutting tool system, comprising:
   a template comprising:
   a planar base (30) extending longitudinally a base longitudinal length between a first lateral base end (15) and a second lateral base end (11) and extending laterally a base lateral width between a longitudinal cutting edge (39) with a predetermined curvature pattern and an opposing substantially straight longitudinal non-cutting edge (25); wherein said planar base (30) comprises multiple laterally narrow portions (31) interspersed with multiple laterally wide portions (35); and
   a positioner (20) attached along said longitudinal non-cutting edge (25) of said planar base (30) at a substantially ninety-degree angle and extending longitudinally along said longitudinal non-cutting edge (25) a distance equal to over one half of said base longitudinal length.

2. The seam cutting tool system, as recited in claim 1 further comprising a connector (40) comprising:
   a connector horizontal member (60) extending laterally between an outer longitudinal edge (49) and an opposing inner longitudinal edge (65) and extending longitudinally from a first lateral end (47) to an opposing second lateral end (48) with a horizontal member middle (66) disposed centrally between said first lateral end (47) and said second lateral end (48);
   wherein a first connector-to-template fastening mechanism is disposed within the area of said connector horizontal member (60) between said first lateral end (47) and said horizontal member middle (66);
   wherein a second connector-to-template fastening mechanism is disposed within the area of said connector horizontal member (60) between said horizontal member middle (66) and said second lateral end (48);
   wherein a first base template-to-connector fastening mechanism is disposed toward said first lateral base end (15) of said planar base (30); and
   wherein a second base template-to-connector fastening mechanism is disposed toward said second lateral base end (11) of said planar base (30).

3. The seam cutting tool system, as recited in claim 2, wherein:
   said first connector-to-template fastening mechanism comprises at least two holes spaced a first pre-selected distance apart;
   said second connector-to-template fastening mechanism comprises at least two holes spaced a second pre-selected distance apart;
   said first base template-to-connector fastening mechanism comprises at least two holes spaced at said first pre-selected distance apart; and
   said second base template-to-connector fastening mechanism comprises at least two holes spaced at said second pre-selected distance apart.

4. The seam cutting tool system, as recited in claim 2, wherein said connector (40) further comprises a connector flange (45) that is attached along said inner longitudinal edge (65) of said connector horizontal member (60) at a substantially ninety-degree angle.

5. The seam cutting tool system, as recited in claim 4, wherein said connector (40) and said connector flange (45) are formed unitarily.

6. The seam cutting tool system, as recited in claim 1, wherein said positioner (20) is formed unitarily with said planar base (30).

7. The seam cutting tool system, as recited in claim 1, wherein said positioner (20) is non-removably attached to said planar base (30).

8. The seam cutting tool system, as recited in claim 1, wherein said predetermined curvature pattern is a wave pattern.

9. The seam cutting tool system, as recited in claim 1, wherein said predetermined curvature pattern is a trapezoidal pattern.

10. The seam cutting tool system, as recited in claim 1, wherein:
    said first lateral base end (15) comprises the center of the left outermost one of said multiple laterally wide portions (35); and
    said second lateral base end (11) comprises the center of the right outermost one of said multiple laterally wide portions (35).

11. The seam cutting tool system, as recited in claim 1, wherein:
    said first lateral base end (15) comprises the center of the left outermost one of said multiple laterally narrow portions (31); and
    said second lateral base end (11) comprises the center of the right outermost one of said multiple laterally narrow portions (31).

12. The seam cutting tool system, as recited in claim 1, further comprising:
    a coordinating template (110) comprising:
    a planar base (130) having a longitudinal cutting edge (139) with a predetermined curvature pattern, having an opposing substantially straight longitudinal non-cutting edge (125), having a first lateral base end (115), and having a second lateral base end (111); wherein said planar base (130) comprises multiple laterally narrow portions (131) interspersed with multiple laterally wide portions (135); and
    a positioner (120) attached along said longitudinal non-cutting edge (125) of said planar base (130) at a substantially ninety-degree angle.

13. The seam cutting tool system, as recited in claim 12, wherein:
    said first lateral base end (115) comprises the center of the left outermost one of said multiple laterally narrow portions (131);
    said second lateral base end (111) comprises the center of the right outermost one of said multiple laterally narrow portions (131);
    said first lateral base end (15) comprises the center of the left outermost one of said multiple laterally wide portions (35); and
    said second lateral base end (11) comprises the center of the right outermost one of said multiple laterally wide portions (35).

14. The seam cutting tool system, as recited in claim 1, wherein said base lateral width is smaller at said laterally narrow portions (31) than at said laterally wide portions (35).

15. A method to cut synthetic turf for creating a seam between a first turf piece and a second turf piece, comprising:
    creating a first turf overlap (75) by turning back a first inner edge (73) of said first turf piece (70), wherein said first turf piece (70) comprises a first grass face and an opposing first turf understructure; and wherein said turning back results in said first turf understructure facing upward and in a portion of said first grass face of said first turf overlap (75) laying adjacent to said first grass face of the un-turned portion of said first turf piece (70);
    creating a second turf overlap (85) by turning back a second inner edge (83) of said second turf piece (80), wherein said second turf piece (80) comprises a second grass face and an opposing second turf understructure; and
    wherein said turning back results in said second turf understructure facing upward and in a portion of said second grass face of said second turf overlap (85) laying adjacent to said second grass face of the un-turned portion of said second turf piece (80);
    distinguishing a first orientation line (77) disposed on said first turf understructure running parallel to said first inner edge (73);
    distinguishing a second orientation line (87) disposed on said second turf understructure running parallel to said second inner edge (83);
    obtaining a template (10) comprising a planar base (30) having a longitudinal cutting edge (39) with a primary curvature pattern, having an opposing longitudinal non-cutting edge (25), having a first lateral base end (15), and having a second lateral base end (11); wherein said planar base (30) comprises multiple laterally narrow portions (31) interspersed with multiple laterally wide portions (35);
    positioning said template (10) with said non-cutting edge (25) aligned with said first orientation line (77);
    manually cutting said first overlap (75) along said cutting edge (39) to create a freshly cut inner edge (74) that corresponds to said primary curvature pattern and to create turf wastage (79); and
    removing said turf wastage (79).

16. The method to cut synthetic turf for creating a seam between a first turf piece and a second turf piece, as recited in claim 15, further comprising:
    positioning said template (10) with said non-cutting edge (25) aligned with said second orientation line (87); and
    manually cutting along said cutting edge (39) to create a freshly cut inner edge (83) that corresponds to said primary curvature pattern and to create turf wastage (89).

17. The method to cut synthetic turf for creating a seam between a first turf piece and a second turf piece, as recited in claim 16, further comprising:
    removing said first turf overlap (75) by reversing said turning back of said first turf piece (70);
    removing said second turf overlap (85) by reversing said turning back of said second turf piece (80)
    placing seam tape under said freshly cut inner edge (74) and said freshly cut inner edge (83); and
    adhesively attaching said freshly cut inner edge (74) and said freshly cut inner edge (83) to said seam tape.

18. The method to cut synthetic turf for creating a seam between a first turf piece and a second turf piece, as recited in claim 15, further comprising:

obtaining a coordinating template (110) comprising a planar base (130) having a longitudinal cutting edge (139) with a coordinating curvature pattern, having an opposing longitudinal non-cutting edge (125), having a first lateral base end (115), and having a second lateral base end (111); wherein said planar base (130) comprises multiple laterally narrow portions (131) interspersed with multiple laterally wide portions (135); and wherein said coordinating curvature is offset from said primary curvature;

positioning said coordinating template (110) with said non-cutting edge (125) aligned along said second orientation line (87); and manually cutting along said cutting edge (139) to create a freshly cut inner edge (83) that corresponds to said coordinating curvature pattern and to create turf wastage (89).

19. The method to cut synthetic turf for creating a seam between a first turf piece and a second turf piece, as recited in claim 18, further comprising:

removing said first turf overlap (75) by reversing said turning back of said first turf piece (70);

removing said second turf overlap (85) by reversing said turning back of said second turf piece (80);

placing seam tape under said freshly cut inner edge (74) and said freshly cut inner edge (83); and adhesively attaching said freshly cut inner edge (74) and said freshly cut inner edge (83) to said seam tape.

20. The method to cut synthetic turf for creating a seam between a first turf piece and a second turf piece, as recited in claim 15, further comprising:

obtaining a duplicate template (10) comprising a planar base (30) having a longitudinal cutting edge (39) with a primary curvature pattern, having an opposing longitudinal non-cutting edge (25), having a first lateral base end (15), and having a second lateral base end (11); wherein said planar base (30) comprises multiple laterally narrow portions (31) interspersed with multiple laterally wide portions (35);

obtaining a connector (40); and removably attaching said connector (40) between said template (10) and said duplicate template (10).

\* \* \* \* \*